United States Patent
Holubarsch et al.

(10) Patent No.: US 10,710,230 B2
(45) Date of Patent: Jul. 14, 2020

(54) HAND-HELD POWER TOOL WITH DETACHABLE CLAMPED CONNECTION

(71) Applicant: Hilti Aktiengesellschaft, Schaan (LI)

(72) Inventors: Markus Holubarsch, Landsberg am Lech (DE); Stefan Schmid, Untermuehlhausen (DE)

(73) Assignee: Hilti Aktiengesellschaft, Schaan (LI)

( * ) Notice: Subject to any disclaimer, the term of this patent is extended or adjusted under 35 U.S.C. 154(b) by 1525 days.

(21) Appl. No.: 14/270,908

(22) Filed: May 6, 2014

(65) Prior Publication Data

US 2014/0326475 A1 Nov. 6, 2014

(30) Foreign Application Priority Data

May 6, 2013 (EP) .................................... 13166684

(51) Int. Cl.
| | |
|---|---|
| *B25D 17/04* | (2006.01) |
| *B25F 5/00* | (2006.01) |
| *B25F 5/02* | (2006.01) |
| *B25D 17/24* | (2006.01) |
| *B25D 16/00* | (2006.01) |
| *B25D 11/00* | (2006.01) |
| *F16B 13/02* | (2006.01) |
| *F16B 37/00* | (2006.01) |

(52) U.S. Cl.
CPC .............. *B25F 5/006* (2013.01); *B25D 11/00* (2013.01); *B25D 16/00* (2013.01); *B25D 17/24* (2013.01); *B25F 5/02* (2013.01); *F16B 13/02* (2013.01); *B25D 2222/54* (2013.01); *B25D 2250/051* (2013.01); *B25D 2250/085* (2013.01); *B25D 2250/361* (2013.01); *F16B 37/005* (2013.01)

(58) Field of Classification Search
CPC ... B25F 5/00; B25F 5/006; B25F 5/02; B25D 17/00; B25D 17/04
USPC ............................................ 173/162.1, 162.2
See application file for complete search history.

(56) References Cited

U.S. PATENT DOCUMENTS

| | | | | |
|---|---|---|---|---|
| 2,455,885 | A | * 12/1948 | Theurer ................ | F16B 37/122 411/80.2 |
| 3,170,523 | A | 2/1965 | Short et al. | |
| 3,531,068 | A | * 9/1970 | Fischer ................... | F16B 13/00 248/560 |
| 3,768,115 | A | * 10/1973 | Hoffmann ............... | F16C 11/04 16/2.1 |
| 4,088,054 | A | * 5/1978 | Lippacher ............. | F16B 13/126 411/67 |

(Continued)

FOREIGN PATENT DOCUMENTS

WO  WO 96/15881  * 5/1996  ............. B25D 17/00

*Primary Examiner* — Gloria R Weeks
(74) *Attorney, Agent, or Firm* — Davidson, Davidson & Kappel, LLC

(57) ABSTRACT

A hand-held power tool has a tool socket 2, a drive 5, 6 for driving the tool socket 2, and a housing 19 in which the drive 5, 6 is accommodated. A stationary part 14 of the drive 5 is connected by means of at least one detachable clamped connection 21 to at least one element 19, whereby the element 19 is the housing 19 or another stationary part of the drive 5, 6. The clamped connection 21 has a cylindrical pocket 22 in the one stationary part 14, a bushing 27 that is made of plastic and that is inserted into the cylindrical pocket 22, and it has a screw 30 that is screwed into the bushing 27.

14 Claims, 2 Drawing Sheets

(56) References Cited

U.S. PATENT DOCUMENTS

| | | | | |
|---|---|---|---|---|
| 4,478,293 A | * | 10/1984 | Weilenmann | B25D 17/043 173/162.2 |
| 4,711,308 A | * | 12/1987 | Blaas | B25D 17/043 16/431 |
| 5,697,456 A | * | 12/1997 | Radle | B25F 5/006 173/162.2 |
| 5,878,823 A | * | 3/1999 | Henriksson | B25D 17/08 173/128 |
| 5,927,407 A | * | 7/1999 | Gwinn | B25D 17/043 173/162.2 |
| 6,966,736 B2 | | 11/2005 | Wolf et al. | |
| 6,981,625 B2 | | 1/2006 | Schad | |
| 7,762,348 B2 | * | 7/2010 | Stirm | B25D 17/043 173/162.1 |
| 8,584,769 B2 | * | 11/2013 | Friedrich | B25D 17/043 173/162.2 |
| 8,708,059 B2 | * | 4/2014 | Hahn | B25D 17/043 173/162.1 |
| 9,168,649 B2 | * | 10/2015 | Harcar | B25D 17/043 |
| 2012/0031639 A1 | * | 2/2012 | Roberts | B25D 17/043 173/162.2 |

\* cited by examiner

HAND-HELD POWER TOOL WITH DETACHABLE CLAMPED CONNECTION

This claims the benefit of European Patent Application EP13166684.4, filed May 6, 2013 and hereby incorporated by reference herein.

The present invention relates to a hand-held power tool, especially to chiseling hand-held power tools.

BACKGROUND

A hammer drill of the type known, for example, from U.S. Pat. No. 6,981,625 consists of several components that are screwed to each other and to the housing. Accordingly, a first part has an inner thread and a second part has an eye. The screw is inserted through the eye of the second part into the first part and screwed into its inner thread. This attachment can advantageously be detached, which is necessary especially when high-end tools have to be serviced.

SUMMARY OF THE INVENTION

The present invention provides a hand-held power tool comprising a tool socket, a drive for driving the tool socket, and a housing in which the drive is accommodated. A stationary part of the drive is connected via at least one detachable clamped connection to at least one element, whereby the element is the housing or another stationary part of the drive. The clamped connection has a cylindrical pocket in the one stationary part, a bushing that is made of plastic and that is inserted into the cylindrical pocket, and it has a screw that is screwed into the bushing.

The positive fit of a screwed connection with a thread and a counter-thread translates into a very stiff attachment, which is conducive to the transmission of vibrations. The above-mentioned clamped connection functions without a positive fit and can nevertheless be detached like a screwed connection.

The drive components, especially the striking mechanism, and to a lesser extent, the motor and the gear, are a source of vibrations. Joining their stationary components, for example, the guide tube, the stator, and the gear housing to the housing or to each other via the above-mentioned clamped connection is worth the extra effort involved with a multi-part clamped connection.

In one embodiment, the pocket is arranged in a metal wall of the one stationary part. The bushing can be spread open in the radial direction by the screw. The bushing can have slits running along its axis.

In one embodiment, the pocket has radial cutouts. The bushing advantageously has hooks that project radially outwards and that loosely engage into the cutouts.

In one embodiment, the screw has a shank with a thread and the screw has a head, the element has an eye, the shank is guided through the eye, and the head rests against the eye.

BRIEF DESCRIPTION OF THE DRAWINGS

The description below explains the invention on the basis of embodiments and figures provided by way of example. The figures show the following.

Unless otherwise indicated, identical or functionally equivalent elements are designated by the same reference numerals in the figures.

DETAILED DESCRIPTION

Figure 1:
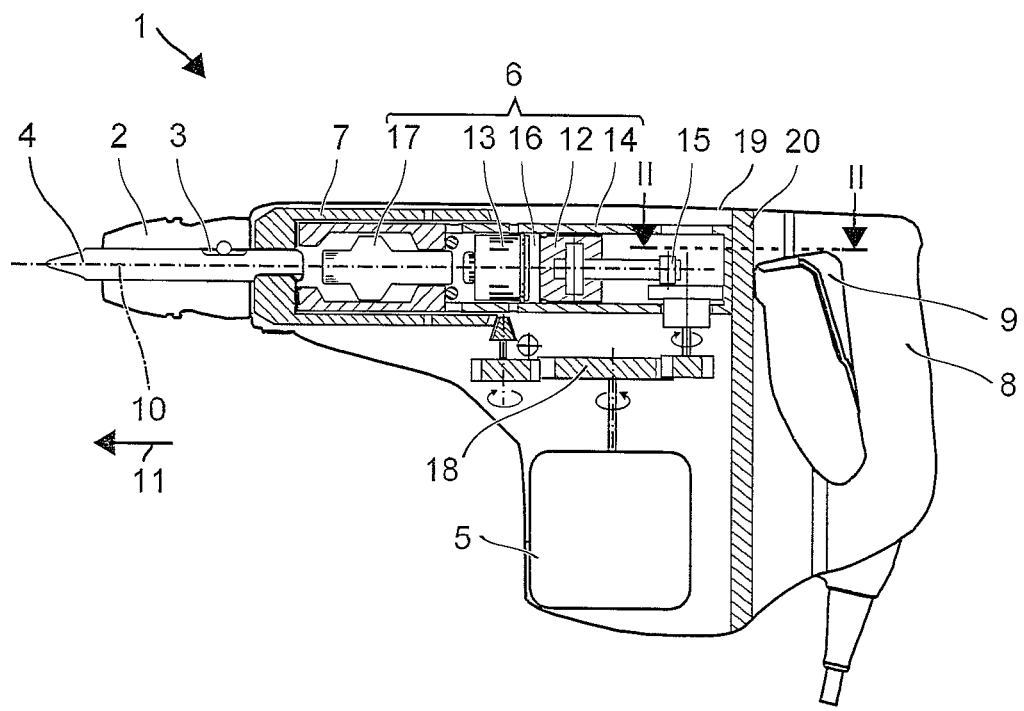
FIG. 1 a hammer drill,
FIG. 2 an attachment of a guide tube,
FIGS. 3, 4 and 5 detailed views of the attachment.

FIG. 1 schematically shows a hammer drill 1 as an example of a chiseling hand-held power tool. The hammer drill 1 has a tool socket 2 into which one shank end 3 of a tool, for example, one end of the drill chisel 4, can be inserted. An electric motor 5 that drives a striking mechanism 6 and a driven shaft 7 constitutes the primary drive of the hammer drill 1. A user can hold the hammer drill 1 by means of a handle 8 and can start up the hammer drill 1 by means of a system switch 9. During operation, the hammer drill 1 rotates the drill bit 4 continuously around a working axis 10 and, in this process, it can hammer the drill bit 4 into a substrate in the striking direction 11 along the working axis 10.

The striking mechanism 6 is, for example, a pneumatic striking mechanism 6. An exciter 12 and a striker 13 are installed in a guide tube 14 of the striking mechanism 6 so as to be movable along the working axis 10. The exciter 12 is coupled to the motor 5 via an eccentric 15 or a toggle element, and it is forced to execute a periodic, linear movement. An air spring formed by a pneumatic chamber 16 between the exciter 12 and the striker 13 couples a movement of the striker 13 to the movement of the exciter 12. The striker 13 can strike the rear end of the drill chisel 4 directly, or else it can transmit part of its pulse to the drill chisel 4 indirectly via an essentially stationary intermediate striker 17.

The motor 5 is coupled to the eccentric 15 via a gear 18. The motor 5, the striking mechanism 6 and the gear are arranged inside a machine housing 19 and attached to it. The machine housing 19 given by way of an example has a vertical plate 20 that closes off a shell facing the tool (i.e. the front shell) of the machine housing 19.

Figure 2:
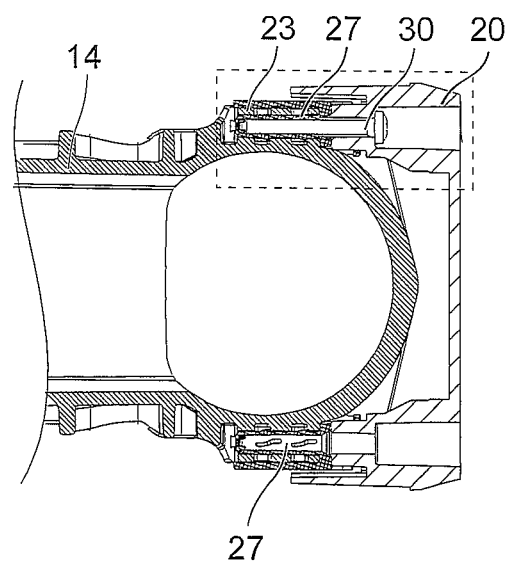
Figure 3:
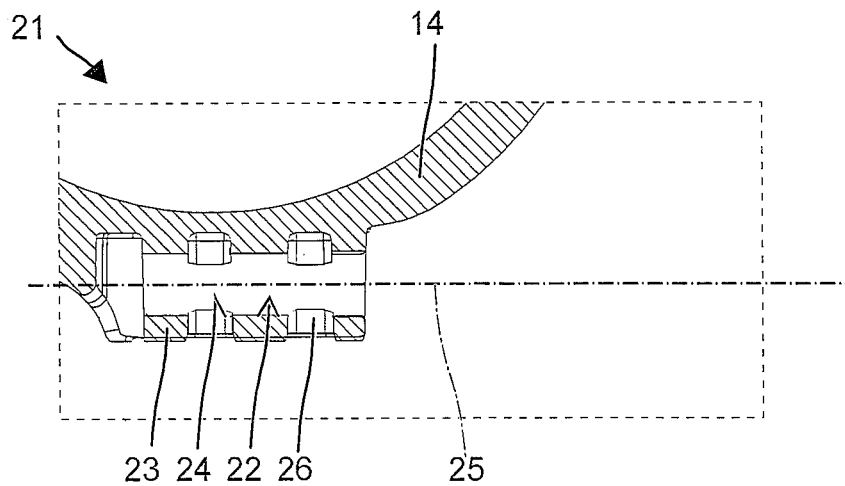
Figure 4:
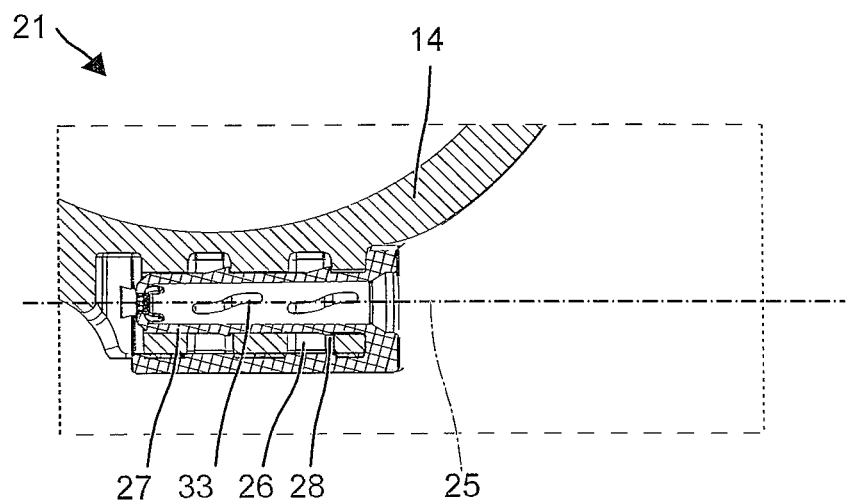
Figure 5:
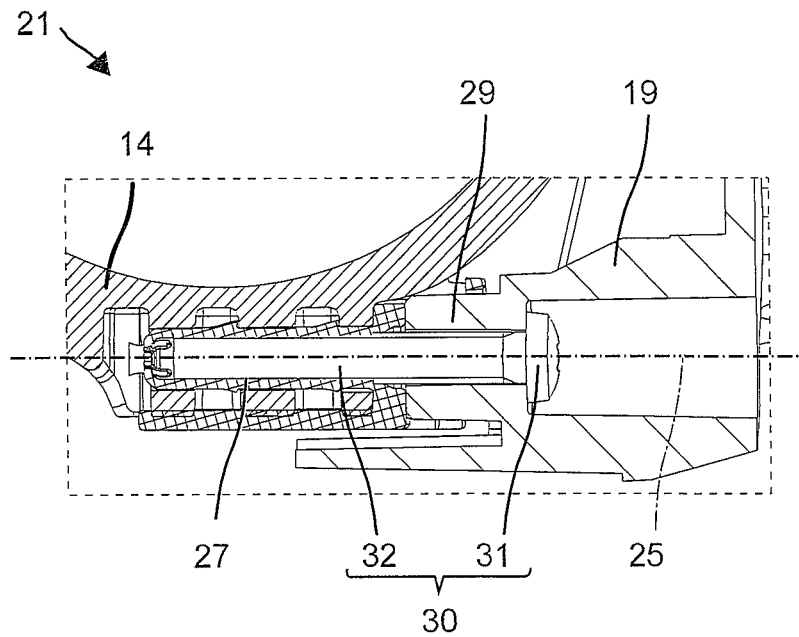

The guide tube 14 is attached by means of a detachable clamped connection 21 to the plate 20. FIG. 2 shows a partial section through the guide tube 14 and the plate 20 in the plane II-II. FIGS. 3, 4 and 5 show the clamped connection 21 in different assembly states.

The outside of the guide tube 14 has one or more cylindrical pockets 22 (FIG. 3). The metal wall 23 of the pocket 22 is integrally bonded to the guide tube 14. Preferably, the guide tube 14 and the cylindrical pocket 22 are cast in one piece. Preferably the pocket 22 is not worked by metal cutting but rather, it has an inner diameter that is already defined sufficiently precisely after the primary forming (casting). The inner surface 24 is virtually smooth. As an alternative, the pocket 22 can be drilled into the outside. The inner surface 24 is preferably smooth, especially without any threads.

The cylindrical inner surface 24 can be perforated along its axis 25 at intervals by cutouts 26 running perpendicular to the axis 25. The intervals between the cutouts 26 are greater than the size of the cutouts 26 along the axis of the inner surface 24. For example, the size of the cutouts 26 along the axis ranges from 2 mm to 5 mm. The inner surface between the cutouts 26 is smooth and unstructured.

A bushing 27 made of plastic is inserted into the cylindrical pocket 22 (FIG. 4). The bushing 27 has a hollow cylindrical body. The outer diameter of the body is approximately equal to the inner diameter of the pocket 22. The bushing 27 lies flush against the cylindrical inner surface 24 of the pocket 22. Due to the smooth inner surface 24 of the pocket 22, it can be inserted or slid in with virtually no force, and this permits a very simple assembly.

The bushing 27 can have hooks 28 projecting radially forward which engage into the cutouts 26. The hooks 28 serve to prevent the bushing 27 from falling out during the assembly.

The plate 20 has an eye 29 that is arranged in the axial extension of the pocket 22. A screw 30 is inserted through the eye 29 into the bushing 27 (FIG. 5). A head 31 of the screw 30 rests on the plate 20. The outer thread 32 of the screw 30 is screwed into the bushing 27. The outer thread 32 expands the bushing 27 in the radial direction and brings about a non-positive fit between the bushing 27 and the pocket 22.

The bushing 27 has several slits 33 running along its axis. The slits 33 increase the radial clamping force. Due to the cutouts 26, the bushing 27 has the tendency to expand in the radial direction rather than in the axial direction when the screw 30 is screwed in.

The screw 30 can be unscrewed from the bushing 27 in order to dismantle the guide tube 14.

What is claimed is:

1. A hand-held power tool comprising:
   a tool socket;
   a drive for driving the tool socket and having a first stationary part connected to or supporting a movable part of the drive;
   a housing, the drive being arranged in the housing, the first stationary part being stationary with respect to the housing; and
   at least one detachable clamped connection connecting the first stationary part to at least one element, the at least one element including at least one of the housing and another stationary part stationary with respect to the housing, the clamped connection having a cylindrical pocket in the first stationary part, a bushing made of plastic and inserted into the cylindrical pocket, and a screw screwed into the bushing.

2. The hand-held power tool as recited in claim 1 wherein the cylindrical pocket is arranged in a metal wall of the first stationary part.

3. The hand-held power tool as recited in claim 1 wherein the bushing is spread open in the radial direction by the screw.

4. The hand-held power tool as recited in claim 1 wherein the pocket has radial cutouts.

5. The hand-held power tool as recited in claim 1 wherein the bushing has hooks projecting radially outwards.

6. The hand-held power tool as recited in claim 1 wherein the bushing has slits running along a bushing axis.

7. The hand-held power tool as recited in claim 1 wherein the screw has a shank with a thread and a head, the one element has a hole, and the shank is guided through the hole and the head rests against the one element.

8. A hand-held power tool comprising:
   a tool socket;
   a drive for driving the tool socket, the drive having an exciter and a guide tube, the exciter moving in the guide tube;
   a housing, the drive being arranged in the housing; and
   at least one detachable clamped connection connecting the guide tube to the housing, the clamped connection having a cylindrical pocket in the guide tube, a bushing made of plastic and inserted into the cylindrical pocket, and a screw screwed into the bushing.

9. The hand-held power tool as recited in claim 8 wherein the housing includes a vertical plate, the guide tube being connected via the detachable clamped connection to the vertical plate.

10. The hand-held power tool as recited in claim 9 wherein the screw has a shank with a thread and a head, the vertical plate has a hole, and the shank is guided through the hole and the head rests against the vertical plate.

11. The hand-held power tool as recited in claim 8 wherein the bushing is spread open in the radial direction by the screw.

12. The hand-held power tool as recited in claim 8 wherein the pocket has radial cutouts.

13. The hand-held power tool as recited in claim 8 wherein the bushing has hooks projecting radially outwards.

14. The hand-held power tool as recited in claim 8 wherein the bushing has slits running along a bushing axis.

* * * * *